Dec. 19, 1967    H. L. DRYDEN, DEPUTY    3,359,409
ADMINISTRATOR OF THE NATIONAL AERONAUTICS
AND SPACE ADMINISTRATION
CORRELATION FUNCTION APPARATUS
Filed April 9, 1963    2 Sheets-Sheet 1
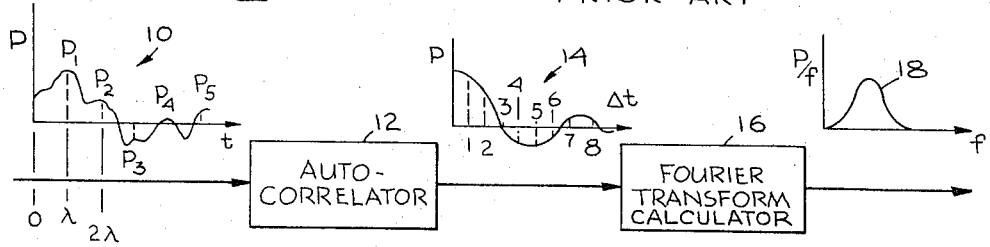
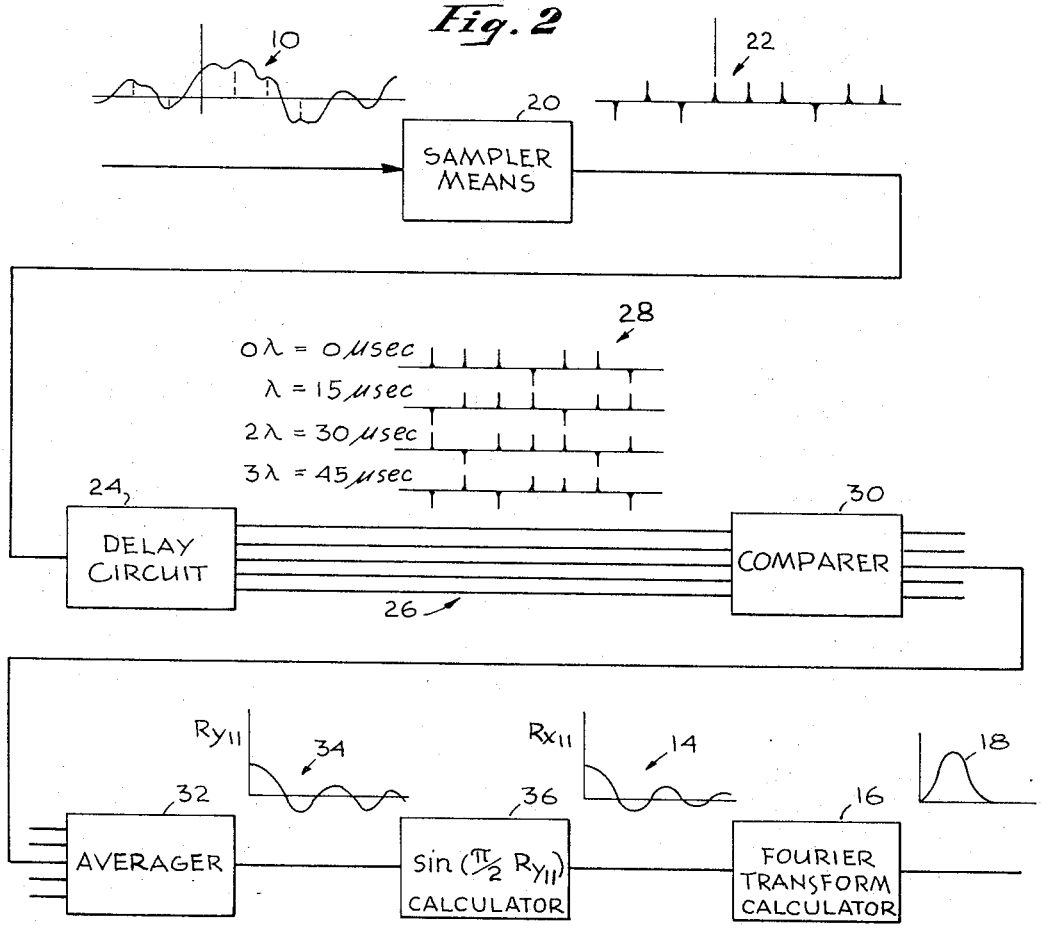
INVENTOR,
RICHARD M. GOLDSTEIN
BY
ATTORNEYS

INVENTOR,
RICHARD M. GOLDSTEIN

United States Patent Office 3,359,409
Patented Dec. 19, 1967

3,359,409
CORRELATION FUNCTION APPARATUS
Hugh L. Dryden, Deputy Administrator of the National Aeronautics and Space Administration, with respect to an invention of Richard M. Goldstein, Los Angeles, Calif.
Filed Apr. 9, 1963, Ser. No. 271,824
7 Claims. (Cl. 235—181)

This invention relates to an improved method and apparatus for developing correlation functions of signals.

The invention described herein was made in the performance of work under a NASA contract and is subject to the provisions of Section 305 of the National Aeronautics and Space Act of 1958, Public Law 85-568 (72 Stat. 435; 42 USC 2457).

The development of correlation functions is of significant interest in the field of communications where, for example, it is desired to identify a signal contained in a very noisy background, as by obtaining the power spectrum or signal power density versus frequency, of the signal. A well known technique for determining the power spectrum of such a signal is to subtract the power spectrum of the noise plus the signal from the power spectrum of the noise taken alone. The difference in the power spectra constitutes the power spectrum of the desired signal.

A well known technique for developing the power spectrum of a signal consists of first determining the autocorrelation function of the signal and then finding the Fourier transform of the autocorrelation function. This technique is discussed in some detail on page 7 of the book entitled "The Measurement of Power Spectra," Blackman and Tukey, Dover Publications, 1958.

The correlation function with which this invention is concerned is identical to that discussed in U.S. Patent 2,854,191 and is defined in general by the following equation:

$$Q_{x12}(\tau) = \lim_{T \to \infty} \frac{1}{T} \int_{-T/2}^{T/2} f_1(t) \cdot f_2(t-\tau) dt \quad (1)$$

In the foregoing equation the terms ($f_1(t)$ and $f_2(t)$) may be different functions of time, in which case the equation defines the cross correlation between the functions. On the other hand, the terms may refer to the same function, in which case the foregoing equation reduces to $$Q_{x11}(\tau) = \lim_{T \to \infty} \frac{1}{T} \int_{-T/2}^{T/2} f_1(t) \cdot f_1(t-\tau) dt \quad (2)$$

which defines the so-called autocorrelation of the function $f_1(t)$. In either case, the left-hand side of the equation is a function of $\tau$ only since $t$ is eliminated by the process of integration.

The foregoing equations define the correlation only for the limiting in which T, the period over which the integration is taken, approaches infinity. In practice, however, interesting and valuable results are obtained in which T, while large compared with $\tau$, is finite. That is to say, it is of advantage to define a "short term" cross correlation $R_{x12}(t,\tau)$ and a "short term" autocorrelation $R_{x11}(t,\tau)$ respectively as $$R_{x12}(t, \tau) = \frac{1}{T}\int_{t-T}^{t} f_1(t) \cdot f_2(t-\tau) dt \quad (3)$$

and $$R_{x12}(t, \tau) = \frac{1}{T}\int_{t-T}^{t} f_1(t) \cdot f_1(t-\tau) dt \quad (4)$$

Evidently the quantity $R_{x12}(t,\tau)$ is a function of the time $t$, as well as the lag $\tau$, and so varies as time progresses. However, at any instant $t$, it is a good approximation to $Q_{x12}(\tau)$, provided only that $T \gg \tau$. To the same extent, and within the same restriction, $R_{x11}(t,\tau)$ is a good approximation to $Q_{x11}(\tau)$.

In the Equations 1 and 2, the period of integration commences in the past and extends into the future. It is of course impossible to instrument this entire integration process with physical means. Therefore, in the Equations 3 and 4, the integration is stated to commence in the past and to extend to the present. The integrals as thus changed are now physically realizable, though the change in form involves no change in their values.

The computation of correlation is of chief interest in the field of communications when the correlation (autocorrelation or cross correlation as the case may be) for one value of the lag $\tau$ is compared with that for other values of the lag $\tau$. It is desirable to effect such a comparison continuously and on a running basis as the signals whose correlation is being determined progress and it therefore becomes necessary to compute the correlation for each of a large number of values of the lag $\tau$ with great rapidity. The result of the computation may then be plotted as a running graphical function of time which serves to reveal features of the signals $f_1(t)$ and $f_2(t)$ which are otherwise obscured.

As a practical matter, according to conventional techniques, the correlation function is developed by measuring signal amplitudes at small finite intervals ($\tau$), e.g. 15 microseconds, over a relatively long time period (T), e.g. 1 hour. Then, a first plurality of products is developed, each of whose factors are signal amplitudes spaced in time by the interval $\tau$ and the average of these products is determined. Then a second plurality of products is developed each of whose factors are signal amplitudes spaced in time by the interval $2\tau$ and the average of these products is determined. Similarly, the averages of products whose factors are signal amplitudes spaced in time by the intervals $3\tau$, $4\tau$, ... $n\tau$, where $n$ may, for example, equal 44 are developed. The relationship between these developed averages products and the corresponding intervals or time delays is of course the correlation function. Where the factors or signal amplitudes all relate to the same time varying signal, the function is called the autocorrelation function, and is principally to this function that the discussion herein will be directed, although it is to be understood that the invention is equally applicable to the development of a cross correlation function.

In order to insure that the developed autocorrelation function depends only on the recurring characteristics of the signal and not on its random variations, the exemplary quantities of $\tau = 15$ microseconds and $T = 1$ hour represent practical choices. From the nature of the calculations required to develop the autocorrelation function, it should be apparent that the use of a high speed digital computer is called for. However, because of the exceedingly great number of calculations which must be performed to develop the function for a signal period as long as one hour, a very great amount of computer time, possibly on the order of 1,000 hours is required.

In view of the amount of computer time required to develop a correlation function by conventional techniques, it is an object of the present invention to provide an improved method and apparatus for continuously developing a correlation function as the signal or signals are received so as to completely develop the function during this receiving period.

It is a further object of the present invention to provide an improved method and apparatus for developing a correlation function which requires considerably less complex circuitry than is required by apparatus operating in accordance with prior art techniques.

Briefly, the invention herein is based on the recognition that a correlation function can be continuously developed by considering, at an appropriate sampling rate, only the algebraic sign of the signal or signals, rather than the amplitude thereof and that by sequentially applying binary signals representative of the sign to delay means consisting of many multiples of basic delays, many such binary signals, each with a different delay are simultaneously made available to thereby permit products of signals separated by a certain time delay to be continuously taken.

In a preferred embodiment of the invention, a signal whose autocorrelation function is desired, is applied to a limiter which operates to develop binary signals (representative of +1 and −1) in accordance with the algebraic sign of the signal. The binary signals are sampled at an appropriate rate (Nyquist rate) and are successively applied to a delay line consisting of a plurality of identical delay stages. The delay line is provided with a plurality of output taps each of which is connected to the line between a pair of adjacent delay stages. A different logical comparer is connected to each of the taps and to the input terminal of the delay line and functions to find the product of the applied binary signals, which it should be recognized is equivalent to comparing the applied undelayed binary signal with the applied binary signal delayed by a specific amount of time for identity. For every positive comparison, i.e. where the binary signals applied to the comparer are identical, an accumulator connected to the particular comparer is incremented by one. By counting the total number of signals applied to the delay line and subtracting this count from twice the count in the accumulator, the numerical difference between the number of positive and negative comparisons and consequently the average of the products of the signs of the signal for the specific delay time can be determined. The plurality of averages provided by the comparers and accumulators associated with the respective taps constitute a distorted autocorrelation function due to the distortion introduced by the limiter. The true autocorrelation function can be represented by $R_{x11}$ which is equal to $$\sin\left(\frac{\pi}{2} R_{y11}\right)$$

where $R_{y11}$ represents the distorted autocorrelation function. The relationship between the true and distorted autocorrelation functions is discussed in the text entitled, "Random Signals and Noise," by Davenport and Root, McGraw-Hill, 1958, on page 107.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a typical prior art autocorrelation system showing the waveforms and functions obtained at each step in the development of the autocorrelation function;

FIGURE 2 is a block diagram of the present invention showing the waveforms and functions obtained at each step in the development of the autocorrelation function.

Figure 3:
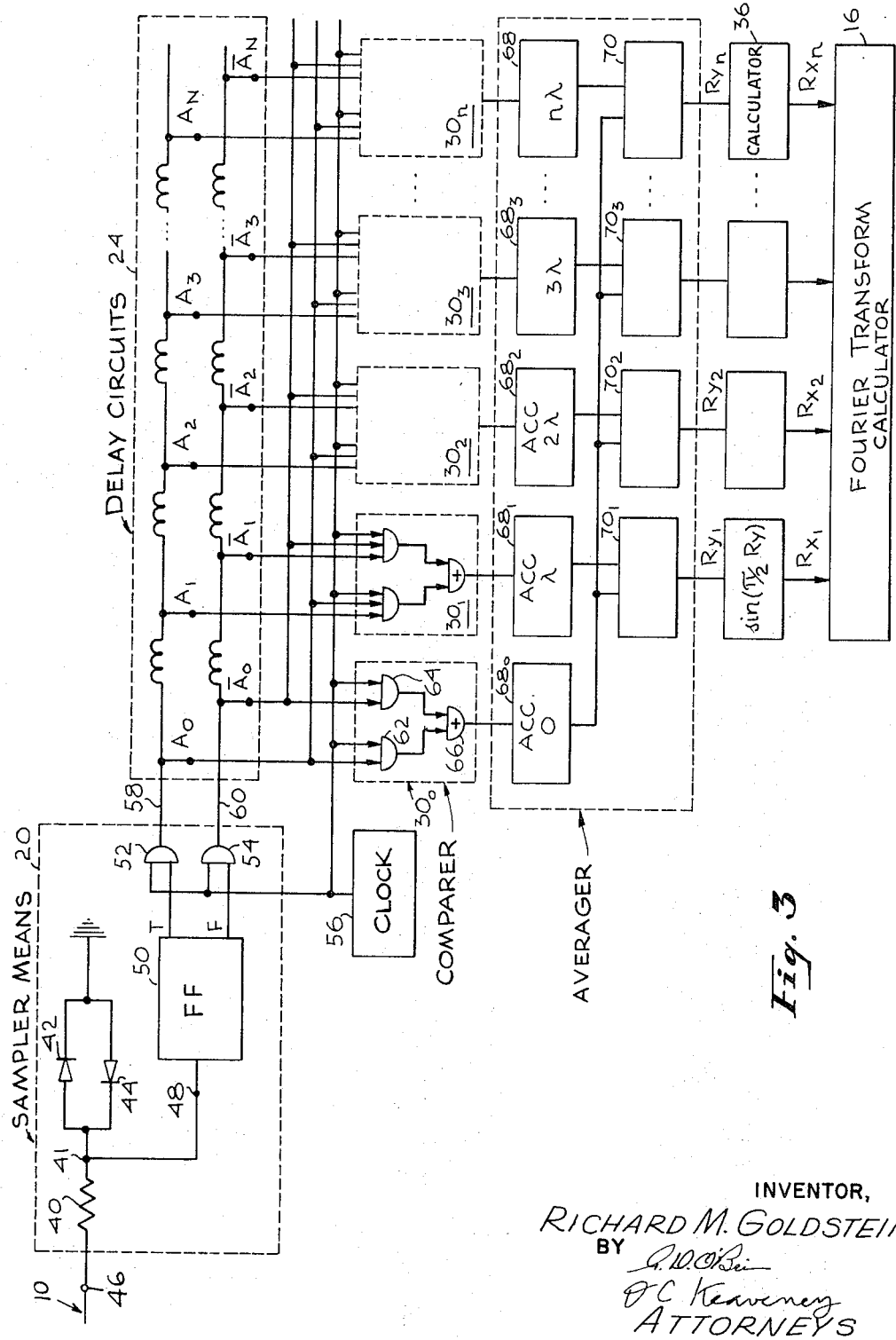
FIGURE 3 is a schematic diagram illustrating a preferred embodiment of the present invention.

Attention is initially called to FIGURE 1 which represents a typical prior art system for compiling the power spectrum of a signal. The incoming signal 10, which can comprise a noisy signal with or without the signal whose power spectrum is ultimately desired, is applied to an autocorrelator 12 to obtain the autocorrelation function 14 of the signal. The autocorrelation function is obtained by averaging the products of signal amplitudes spaced in time by an integral number of finite time delays ($\tau$). That is, assuming the quantities $P_0$, $P_1$, $P_2$, ... $P_n$ represent the amplitude of the signal 10 at times 0, $\tau$, $2\tau$ ... $n\tau$, the average of the products $P_0P_1$, $P_1P_2$, $P_2P_3$ ... $P_{n-1}P_n$ represents the initial point on the autocorrelation function 14. Similarly the average of the products $P_0P_2$, $P_1P_3$, $P_2P_4$ ... $P_{n-2}P_n$ represents a second point, etc. The autocorrelator 12 performs the necessary calculations to obtain all points of the autocorrelation function 14. In order to develop the power spectrum of the signal from the autocorrelation function 14, the autocorrelation function is applied to a calculator 16 which in turn yields the Fourier transform 18 of the auto-correlation function 14. As is well known, the Fourier transform of the autocorrelation function constitutes the power spectrum, i.e. power density versus frequency, of the signal 10.

Attention is now called to FIGURE 2 which illustrates, in block diagram form, the technique for developing the autocorrelation function and ultimately the power spectrum in accordance with the invention. Essentially, the technique according to the invention differs from the prior art technique in that instead of finding the products of the amplitude of the signal at points spaced in time, the products of the algebraic signs of the signal are utilized. More particularly, again assume it is desired to develop the power spectrum of an arbitrary signal 10. The signal 10 is applied to sampler means 20 which in turn functions only to provide the algebraic signs of the signal 10 at an appropriate rate. More particularly, note the output signal 22 derived from sampler means 20. Output signal 22 consists of a series of equal amplitude pulses which are either positive or negative (+1 or −1) in accordance with the algebraic sign of the signal 10. Output signal 22 is in turn applied to a delay circuit 24 which is provided with a plurality of output lines 26 each representative of a different integral number of basic delay periods. That is, if the signal 10 was being sampled at a 15 microsecond ($\tau$) rate, no time delay would be associated with a first output line of the means 24, a time delay equal to $\tau$ would be associated with a second output line, a time delay equal to $2\tau$ would be associated with a third output line, etc. The signal patterns respectively appearing on several of the delay circuit output lines 26 are generally identified by the designating numeral 28. The output lines 26 of the delay circuit 24 are in turn respectively connected to a plurality of comparer circuits 30 each of which functions to obtain the product of the signal appearing on the first output line and the signal appearing on the unique output line to which it is connected every 15 microseconds. It should be apparent that the product will be either +1 or −1. The comparer circuits 30 are in turn connected to an averager 32 which functions to continually maintain an average of all of the products respectively associated with each of the various delay times. More particularly, the averager 32 yields the average of all products having factors spaced in time by 15 microseconds, the average of all products having factors spaced in time by 30 microseconds, etc. These averages are continuously taken so that after a period of, for example one hour, all points of a distorted autocorrelation function $R_{y11}$, represented by the curve 34, are known. The distortion is of course due to the fact that only the algebraic signs of the signal 10 were considered rather than the exact amplitudes of the signal 10. However, it has been found that the distorted signal $R_{y11}$ can be modified to arrive at the true autocorrelation function $R_{x11}$ by finding $$\sin\left(\frac{\Pi}{2}R_{y11}\right)$$

This calculation can be performed by calculator 36 to thereby provide the true autocorrelation function $R_{x11}$, represented by the curve 14 at the output thereof. The true autocorrelation $R_{x11}$ can then be applied to a calculator 16 to develop the Fourier transform 18 according to conventional techniques. Calculator 36 can, for example, comprise a special purpose circuit or any conventional general purpose digital computer.

From the foregoing, it should be apparent that the technique described by FIGURE 2 differs substantially from the prior art technique described by FIGURE 1 in that the autocorrelation function is compiled concurrent with the reception of the signal 10 so that at the end of the sampling period of the signal 10, the completed autocorrelation function is available. The continual real time compilation of the autocorrelation function avoids the necessity of devoting a substantial amount of computer time to its compilation. The reason, of course, which permits the continual compliation of the autocorrelation function, as shown in FIGURE 2, is because only the algebraic signs of the signal 10 are considered rather than the exact amplitudes of these signals as shown in FIGURE 1 and in addition because the delay circuit 24 simultaneously provides signals having many multiples of a basic delay. In addition to eliminating the requirement of utilizing a substantial amount of computer time, it should be apparent that considerably less complex circuitry is required to perform the operations necessitated in FIGURE 2 than is required to perform those essential to FIGURE 1.

Attention is now called to FIGURE 3 which illustrates in schematic form a preferred embodiment of the invention illustrated in block form in FIGURE 2. More particularly, the sampler means 20 is provided with a limiter circuit including a resistor 40 connected to ground through a pair of oppositely poled paralleled diodes 42 and 44. The signal 10 whose autocorrelation function is desired is applied to input terminal 46 connected to the resistor 40. The input terminal 48 of a flip-flop 50 is connected to the junction 41 defined between the resistor 40 and diodes 42 and 44. The flip-flop 50 is provided with true and false output terminals which are respectively connected to the inputs of And gates 52 and 54. The second input to each of And gates 52 and 54 is connected to the output of a conventional clock pulse generator 56 which functions to provide clock pulse signals at a specified rate (Nyquist rate, herein assumed to be every 15 microseconds).

The outputs of the And gates 52 and 54 are respectively connected to delay lines 58 and 60. Each of the delay lines 58 and 60 includes a chain of delay elements, each element capable of delaying a signal applied to its respective delay line by an identical finite period equal to $\tau$ (15 microseconds). Taps are connected along the length of each delay line to permit application of the signals applied to the delay line to appropriate ones of the comparer circuits 30. The nomenclature utilized to identify the various taps is as follows: the taps connected to the delay line 58, which in turn is connected to the true output terminal of the flip-flop 50, will be identified by the upper case letter "A" together with a subscript indicative of the number of delay stages between the identified tap and the input to the delay line. Consequently, the initial tap connected to delay line 58 will be identified as $A_0$ meaning of course that an undelayed signal can be sample at this tap. Similarly, the next tap connected to delay line 58 will be identified as $A_1$ meaning that the signal sampled at this tap will be delayed by one finite period equal to $\tau$. The next tap will be identified as $A_2$ meaning that a signal sampled at this tap will be delayed two finite periods equal to $2\tau$. The taps connected to delay line 60 will be similarly identified except however inasmuch as this delay line is connected to the false output terminal of flip-flop 50, the symbol $\overline{A}$ will be utilized in lieu of the symbol A.

In order to compile the average of the products for each specific time delay, a plurality of comparer circuits 30 is provided. The individual comparer circuits 30 will be identified by the numeral 30 together with a subscript 0, 1, 2, . . . n to indicate the integral number of finite periods constituting the time delay between the binary signals applied to it. That is, comparer circuit $30_3$ for example is dedicated to comparing or finding the product of all signals separated by an interval equal to three finite periods $(3\tau)$. Each of the comparer circuits 30 includes a pair of And gates 62 and 64 whose outputs are respectively connected to the inputs of an Or gate 66. The output of clock pulse generator 56 is connected to the input of each of the And gates 62 and 64 of each of the comparer circuits 30. Similarly, the delay line taps $A_0$ and $\overline{A}_0$ are respectively connected to the inputs of the And gates 62 and 64 of all of the comparer circuits 30. Additionally, the delay line taps $A_1$ and $\overline{A}_1$ are respectively connected to the And gates 62 and 64 of comparer circuit $30_1$, the taps $A_2$ and $\overline{A}_2$ to the inputs of And gates 62 and 64 respectively of the comparer circuit $30_2$, etc.

The outputs of the Or gates 66 of each of the comparer circuits 30 is respectively connected to an accumulator 68 forming part of the averager 32. The accumulators 68 perform a counting function. That is, each of the accumulators 68 functions to count the number of output signals generated by the Or gate 66 connected to the input thereof. The accumulator $68_0$ is connected to the comparer $30_0$ and its output is connected to the input of a plurality of arithmetic circuits 70, also forming part of averager 32, each of which, is in addition connected to the output of a different unique one of the accumulators 68. The output of each of the arithmetic circuits 70 represents a point on the distorted autocorrelation function curve 34 previously discussed in connection with FIGURE 2. By applying the output from each of the arithmetic circuits 70 to previously mentioned calculators 36 to perform the required correction, the true autocorrelation function $R_{x11}$ can be provided. The output of the correction circuits 36 is in turn applied to calculating means 16 which functions to find the Fourier transform of the autocorrelation function $R_{x11}$ which, as was previously noted, results in the development of the power spectrum of signal 10.

In the operation of the embodiment of FIGURE 3, the signal 10 is applied to the input terminal 46 of the sampler means 20. So long as the signal 10 is positive, a current will exist in resistor 40 and diode 42 and accordingly establish a positive voltage at the junction 41 equal to the drop across diode 42. On the other hand, if the signal 10 is negative, a negative voltage of equal magnitude will be established at junction 41 by virtue of the drop across diode 44. By connecting junction 41 to the input terminal 48 of flip-flop 50, the flip-flop is caused to assume one state, for example the true state, in response to a positive voltage level at junction 41 and its other or false state in response to a negative voltage level at junction 41. When the flip-flop 50 is in its true state, an output signal will be provided by And gate 52 in response to the application of a pulse thereto by clock pulse generator 56. On the other hand, when flip-flop 50 is in its false state, the And gate 54 will provide an output signal in response to the application of a pulse thereto by the clock pulse generator 56. The pulses so generated by the And gates 52 and 54 will respectively travel down the delay lines 58 and 60, being delayed by a finite amount by each delay element.

One of the And gates 62 or 64 of the comparer circuit $30_0$ will, of course, provide an output pulse each time a clock pulse is generated inasmuch as a pulse must concurrently appear at one of the taps $A_0$ or $\overline{A}_0$. Consequently, Or gate 66 will provide an output signal which will increment the accumulator $68_0$ by one. In other words, the accumulator $68_0$ will maintain a running count of the total number of pulses applied to the delay lines 58 and 60. On the other hand, comparer circuit $30_1$ will provide an output signal to accumulator $68_1$ only when the product of two signals spaced in time by a time delay equal to $\tau$ is one. More particularly, by connecting taps $A_0$ and $A_1$ to the inputs of And gate 62 of comparer circuit $30_1$ and tap $\overline{A}_0$ and $\overline{A}_1$ to the inputs of And gate 64 of comparer circuit $30_1$, an output signal will be provided by Or gate 66 of the comparer circuit only when the product of the signals spaced in time by $\tau$ is equal to $+1$. The accumulator $68_1$ therefore keeps a running count of the number of identical comparisons between signals spaced in time by a time delay equal to $\tau$. By knowing the total number of signals applied to the delay lines 58 and 60 and by knowing the count in each of the accumulators $68_1$–$68_n$ the number of products equal to $+1$ and $-1$ and consequently the average of the products of signals spaced in time by each integral number of finite periods $\tau$ can be determined. The arithmetic functions necessary to arrive at these averages are performed in the arithmetic circuits 70. As a consequence, the outputs of the various arithmetic circuits 70 represent the average product for the particular time delay with which the arithmetic circuit is associated. As pointed out, by operating upon these average products in calculator circuits 34 and by then finding the Fourier transform of the resulting autocorrelation function, the desired power spectrum of the signal 10 is developed.

From the foregoing, it should be apparent that a method and an apparatus for more easily compiling the correlation function, be it the autocorrelation or cross correlation function of a signal (or signals) has been disclosed. More particularly, the specification has herein taught a method and apparatus for continuously compiling a correlation function so that the correlation function is immediately available at the termination of the sampling period over which the compilation of the correlation function is desired. The continuous compilation of a correlation function concurrent with the sampling of the signal for which the function is desired of course represents a considerable improvement over the previously mentioned prior art techniques which necessitate considerable computing time to arrive at the same results arrived at by utilization of the invention.

I claim:

1. Apparatus for generating the autocorrelation function of a specified signal comprising; first means for successively developing binary signals, at a specified sampling rate, in accordance with the algebraic sign of said specified signal; a plurality of second means for respectively comparing binary signals representative of the sign of said specified signal spaced in time by predetermined respective amounts for determining a distorted autocorrelation function of said specified signal; and means for correcting said distorted autocorrelation function.

2. Apparatus for generating the autocorrelation function of a specified signal comprising first means for developing binary signals in accordance with the algebraic sign of said specified signal; a plurality of delay means each capable of delaying a signal applied thereto by a different specified amount; sampling means for applying said developed binary signals to all of said delay means at a specified rate; a plurality of comparing means each of which is connected to a different unique one of said delay means for continuously comparing for identity the delayed binary signal applied thereto with an undelayed binary signal simultaneously developed by said first means and for developing a count representing the numerical difference between the number of identical and unidentical comparisons to thereby develop the distorted autocorrelation function of said specified signal; and means for correcting said distorted autocorrelation function to develop a true autocorrelation function.

3. The apparatus of claim 2 wherein said specified rate is the Nyquist rate.

4. The apparatus of claim 2 wherein said true autocorrelation function is equal to $R_{x11}$ and said distorted autocorrelation function is equal to $$\frac{\pi}{2} \sin^{-1}(R_{x11})$$

5. Apparatus for generating the autocorrelation function of a specified signal comprising first means for developing binary signals in accordance with the algebraic sign of said specified signal; a plurality of delay means each capable of delaying a signal applied thereto by a different specified amount; sampling means for applying said developed binary signals to all of said delay means at a specified rate; a plurality of comparing means each of which is connected to a different unique one of said delay means and each capable of providing an output signal each time the delayed binary signal applied thereto is identical to the undelayed binary signal simultaneously developed by said first means; first counting means for counting the number of binary signals applied to all of said delay means; a plurality of second counting means each of which is connected to a different unique one of said comparing means for counting the number of output signals provided thereby; subtraction means connected to said first counting means and each of said second counting means for determining the numerical differences be-between the number of identical and unidentical comparisons performed by each comparison means to thereby develop a distorted autocorrelation function of said specified signal; and means for correcting said distorted autocorrelation function.

6. Apparatus for generating the autocorrelation function of a specified signal comprising first means for developing binary signals in accordance with the algebraic sign of said specified signal; a delay line having an input terminal and including a plurality of identical delay elements and a plurality of taps each of which is connected to said delay line between a different unique pair of adjacent elements; sampling means for applying said developed binary signals to said delay line input terminal; a plurality of comparing means each of which is connected to said delay line input terminal and to a different unique one of said taps for developing an output signal each time the respective binary signals applied thereto are identical; first counting means for counting the number of binary signals applied to said delay line input terminal; a plurality of second counting means each of which is connected to a different unique one of said comparing means for counting the number of output signals developed thereby; subtraction means connected to said first counting means and each of said second counting means for determining the numerical differences between the number of identical and unidentical comparisons performed by each comparison means to thereby develop a distorted autocorrelation function of said specified signal; and means for correcting said distorted autocorrelation function.

7. Apparatus for generating the cross correlation function of first and second signals comprising first means for successively developing first binary signals, at specified sampling rate in accordance with the algebraic sign of said first signal; second means for successively developing second binary signals, at said specified sampling rate, in accordance with the algebraic sign of said second signal; a plurality of third means for respectively comparing each of said first binary signals with a plurality of said second binary signals delay in time by different amounts for determining a distorted cross correlation function of said first and second signals; and means for correcting said distorted cross correlation function.

References Cited

UNITED STATES PATENTS

| | | | |
|---|---|---|---|
| 3,054,003 | 9/1962 | Pagens et al. | 328—140 XR |
| 3,244,986 | 4/1966 | Rumble | 328—140 |
| 2,908,761 | 10/1959 | Raisbeck | 179—15.55 |
| 2,953,645 | 9/1960 | Schroeder | 179—15.55 |
| 3,069,507 | 12/1962 | David | 235—1816 XR |
| 3,180,936 | 4/1965 | Schroeder | 179—15.556 XR |
| 3,109,070 | 10/1963 | David | 179—15.55 |

OTHER REFERENCES

Cain, A. L. et al.: The Use of Transistors in a Digital Correlator for Processing Radar Information in Proceedings of the Institution of Electrical Engineers, vol. 106, part B, suppl. No. 16, pp. 649–656, May 1959.

MALCOLM A. MORRISON, *Primary Examiner.*

I. KESCHNER, J. RUGGIERO, *Assistant Examiners.*